US012605717B2

(12) United States Patent
Denis

(10) Patent No.: US 12,605,717 B2
(45) Date of Patent: Apr. 21, 2026

(54) MATERIAL PROCESSING HEAD AND TOOL AND RELATED METHODS

(71) Applicant: Alamo Group Inc., Seguin, TX (US)

(72) Inventor: Laurent Denis, Roxton Falls (CA)

(73) Assignee: Alamo Group Inc., Seguin, TX (US)

( * ) Notice: Subject to any disclaimer, the term of this patent is extended or adjusted under 35 U.S.C. 154(b) by 0 days.

(21) Appl. No.: 18/590,492

(22) Filed: Feb. 28, 2024

(65) Prior Publication Data

US 2024/0198352 A1 Jun. 20, 2024

Related U.S. Application Data

(63) Continuation of application No. 17/208,833, filed on Mar. 22, 2021, now Pat. No. 11,944,978, which is a
(Continued)

(51) Int. Cl.
| | |
|---|---|
| *B02C 18/18* | (2006.01) |
| *A01D 34/835* | (2006.01) |
| *A01G 23/00* | (2006.01) |

(52) U.S. Cl.
CPC .......... *B02C 18/184* (2013.01); *A01D 34/835* (2013.01); *A01G 23/00* (2013.01); *B02C 18/18* (2013.01)

(58) Field of Classification Search
CPC ...... B27B 33/144; B23D 61/04; B23D 61/06; B23D 61/065; B23D 61/14; B23D 61/16;
(Continued)

(56) References Cited

U.S. PATENT DOCUMENTS

| | | | |
|---|---|---|---|
| 4,257,566 A | | 3/1981 | Lawrence |
| 5,451,128 A | * | 9/1995 | Hattersley .......... B23B 51/0466 83/843 |

(Continued)

FOREIGN PATENT DOCUMENTS

| | | |
|---|---|---|
| CA | 2115617 | 2/1994 |
| CA | 2546294 A1 | 11/2007 |

(Continued)

OTHER PUBLICATIONS

Decision to Grant issued Jul. 13, 2020 in corresponding Russia Patent Application No. 2018140441 and an English translation of the allowed claims (18 pages).
(Continued)

*Primary Examiner* — Bobby Yeonjin Kim
(74) *Attorney, Agent, or Firm* — Pizarro Allen PC

(57) ABSTRACT

A material processing tool assembly includes a tool for material processing having a base section and a processing section extending from the base section; and a tool mounting block mountable on an outer surface of a support base. The mounting block has a base surface and a tool mounting surface intersecting the base surface. The base surface has a protuberance extending away therefrom and spaced apart from the tool mounting surface to define a tool receiving gap between the protuberance and the tool mounting surface. The base section of the tool is snugly received in the tool receiving gap between the tool mounting surface and the protuberance in abutment with the tool mounting surface, the processing section of the tool extending past the protuberance. A displaceable material processing head and method of mounting a material processing tool to a mounting block secured to a displaceable head are also discussed.

9 Claims, 6 Drawing Sheets

Related U.S. Application Data continuation of application No. 15/132,831, filed on Apr. 19, 2016, now Pat. No. 10,953,406.

(58) Field of Classification Search
CPC ....... B02C 18/184; B02C 18/18; A01G 23/00; A01D 34/835
See application file for complete search history.

(56) References Cited

U.S. PATENT DOCUMENTS

| | | | | |
|---|---|---|---|---|
| 5,779,167 | A | 7/1998 | Wagstaff | |
| 5,941,469 | A | 8/1999 | Spiegemacher | |
| 6,502,609 | B1 | 1/2003 | Guels | |
| 6,764,035 | B2 | 7/2004 | Denis et al. | |
| 7,404,421 | B2 | 7/2008 | Guels | |
| 7,634,897 | B2 | 12/2009 | MacLennan et al. | |
| 8,167,225 | B2 * | 5/2012 | Gaudreault | B23C 5/2239 |
| | | | | 241/101.77 |
| 8,534,580 | B2 | 9/2013 | Rice et al. | |
| 8,540,033 | B2 | 9/2013 | Stanley et al. | |
| 8,893,997 | B2 * | 11/2014 | Gaudreault | B26D 7/2614 |
| | | | | 241/242 |
| 10,118,178 | B2 * | 11/2018 | Doppstadt | B02C 18/18 |
| 10,201,130 | B2 * | 2/2019 | Stanley | B27B 33/02 |
| 2001/0045478 | A1 * | 11/2001 | Recker | B02C 18/145 |
| | | | | 241/294 |
| 2003/0222164 | A1 | 12/2003 | Denis et al. | |
| 2005/0127220 | A1 | 6/2005 | Rankin, Sr. | |
| 2005/0156459 | A1 | 7/2005 | Roozeboom et al. | |
| 2008/0172912 | A1 * | 7/2008 | Denis | E02F 9/2825 |
| | | | | 37/452 |
| 2010/0206973 | A1 * | 8/2010 | Cotter | B02C 13/2804 |
| | | | | 241/192 |
| 2012/0018560 | A1 * | 1/2012 | Denis | B02C 18/18 |
| | | | | 241/294 |
| 2013/0168477 | A1 * | 7/2013 | Doppstadt | B02C 13/04 |
| | | | | 241/197 |

FOREIGN PATENT DOCUMENTS

| | | | |
|---|---|---|---|
| CA | 2618121 | A1 | 7/2008 |
| CA | 2531985 | C | 8/2009 |
| RU | 34 062 | U1 | 11/2003 |
| RU | 2 567 456 | C2 | 11/2015 |
| RU | 2 569 420 | C2 | 11/2015 |
| WO | 20100135838 | A1 | 12/2010 |

OTHER PUBLICATIONS

Office Action issued Jul. 27, 2020 in corresponding Indonesia Patent App. No. P00201809390 (2 pages).

The European Search Report and Written Opinion dated Nov. 7, 2019 in corresponding European Patent Application No. 17785195.3 (5 pages).

International Search Report and Written Opinion issued Jul. 25, 2017 in corresponding PCT International App. No. PCT/CA2017/050451 (8 pages).

* cited by examiner

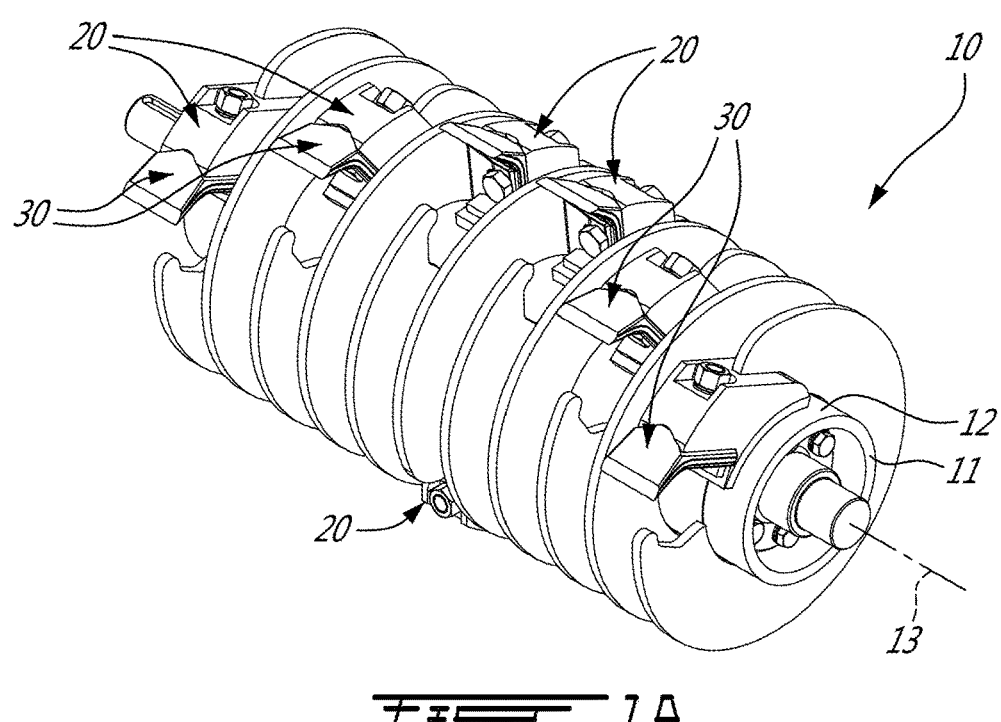
$\boxed{\textsf{FIG}}\text{.}1\text{A}$
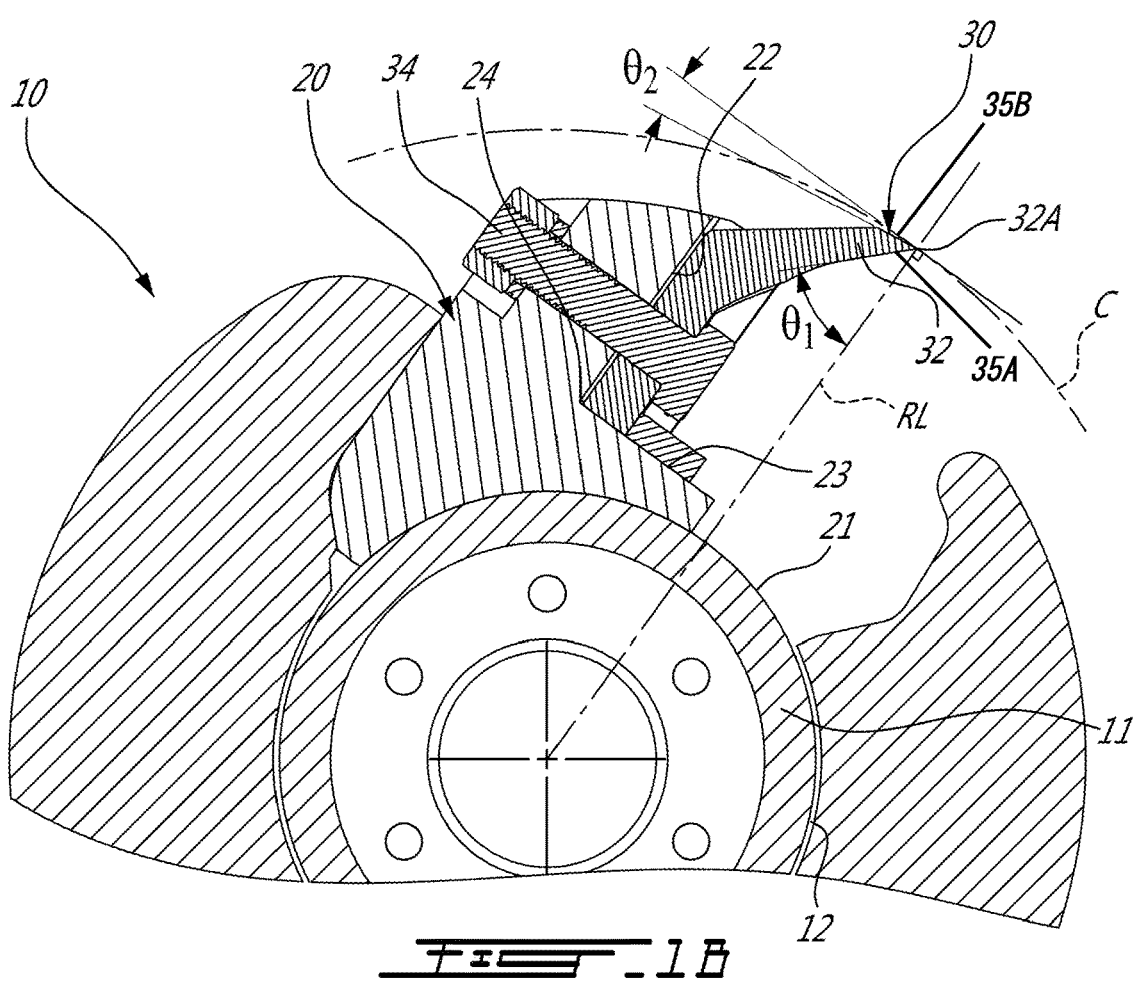
$\boxed{\textsf{FIG}}\text{.}1B$

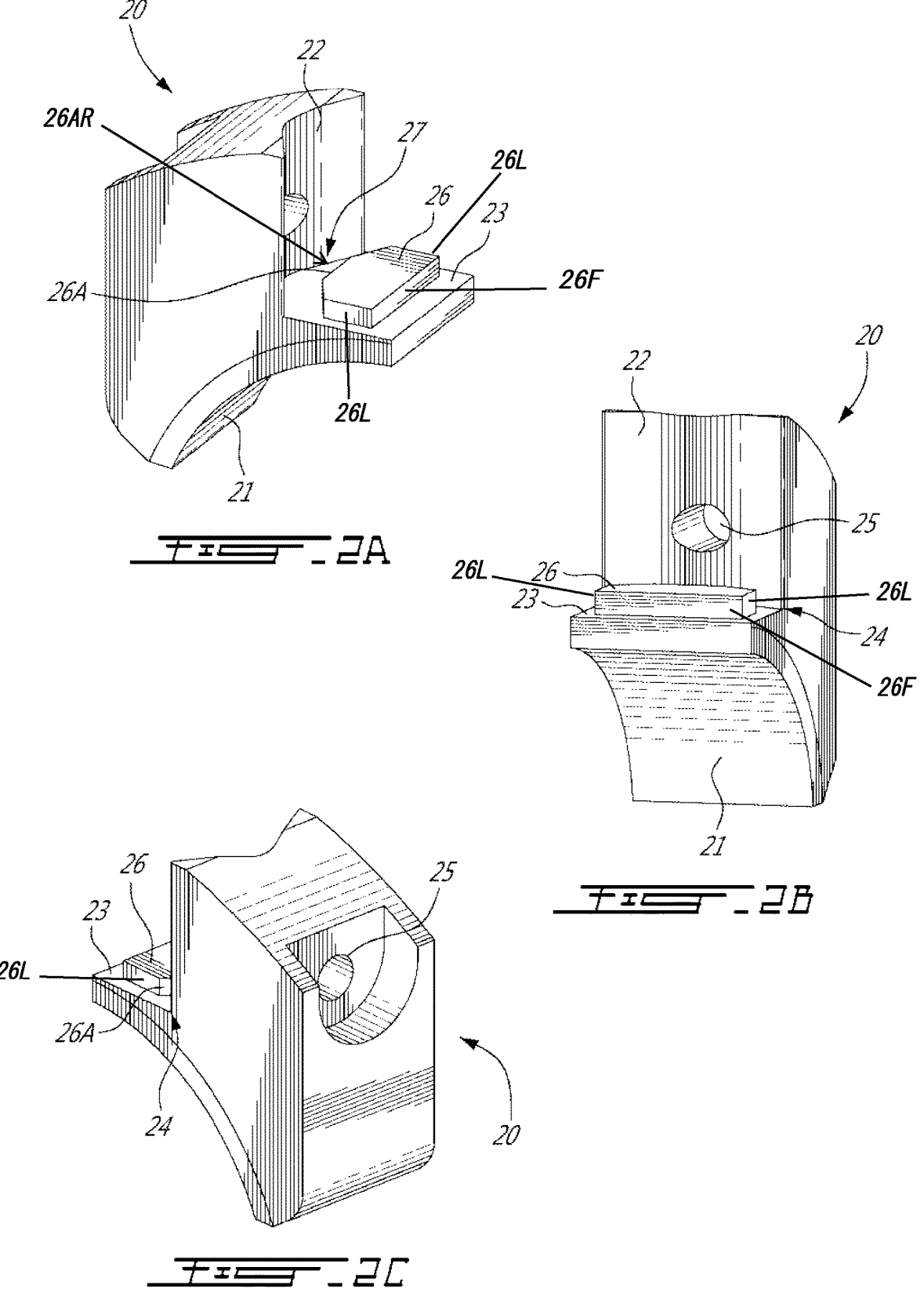

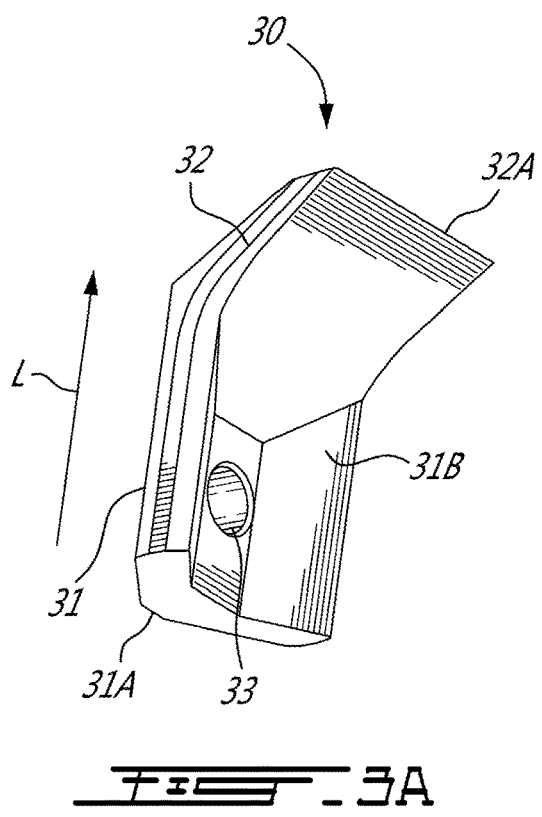
_FIG. 3A_
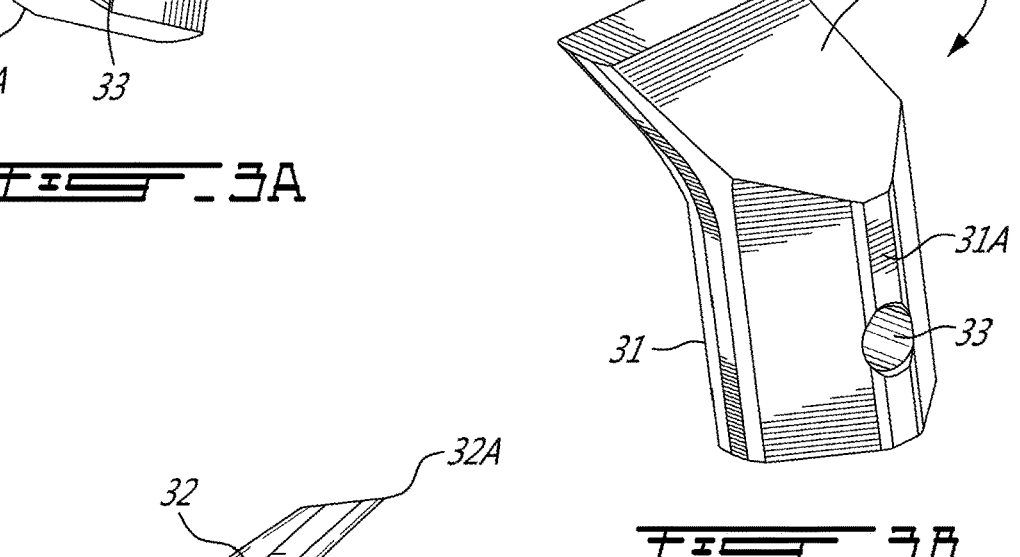
_FIG. 3B_
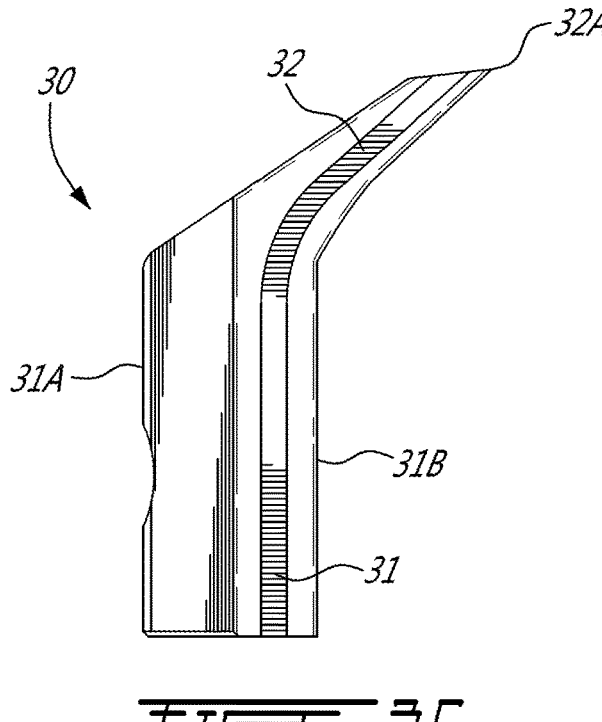
_FIG. 3C_

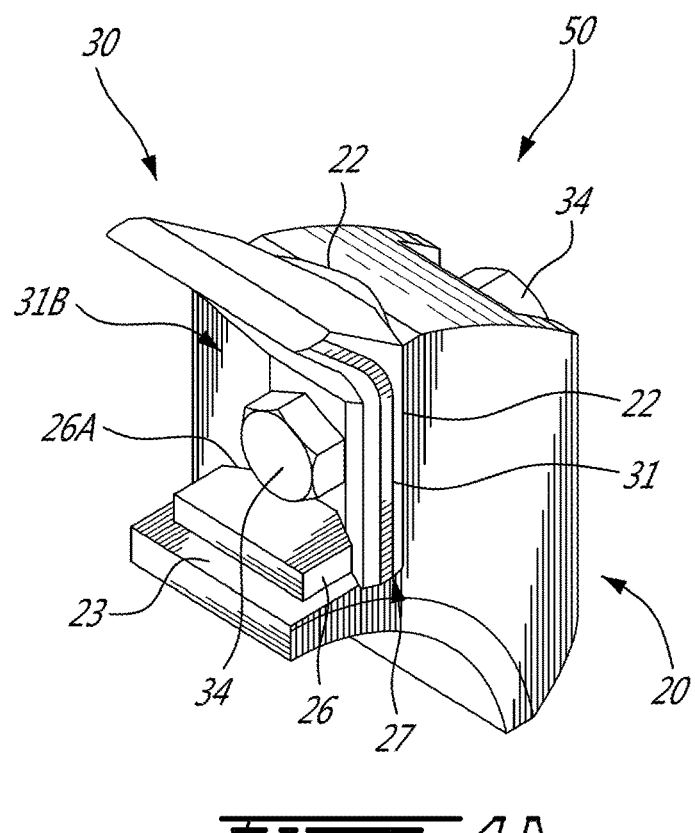
$F_{I}G. 4A$
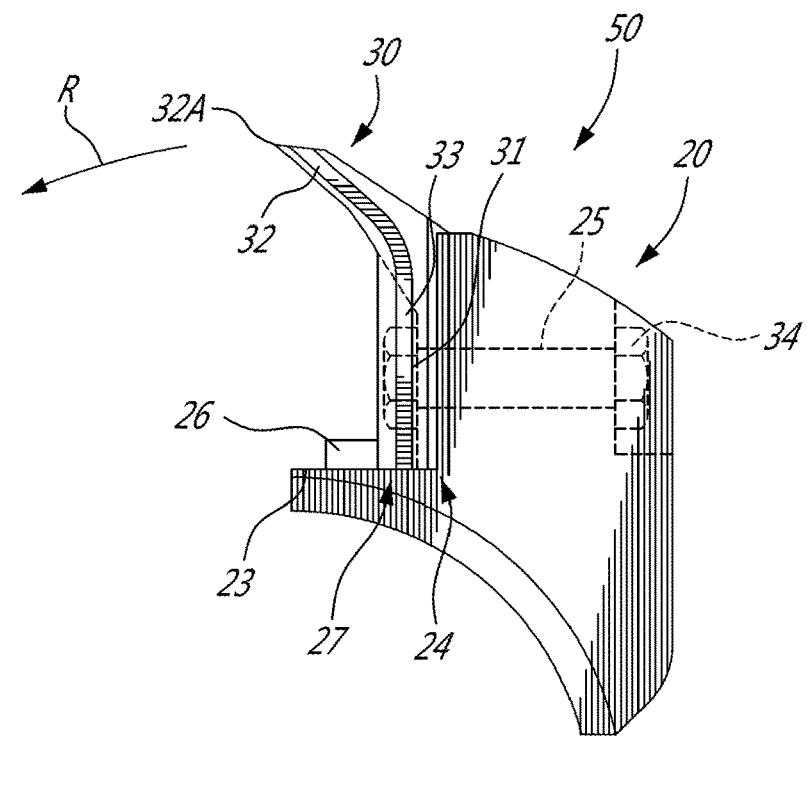
$F_{I}G. 4B$

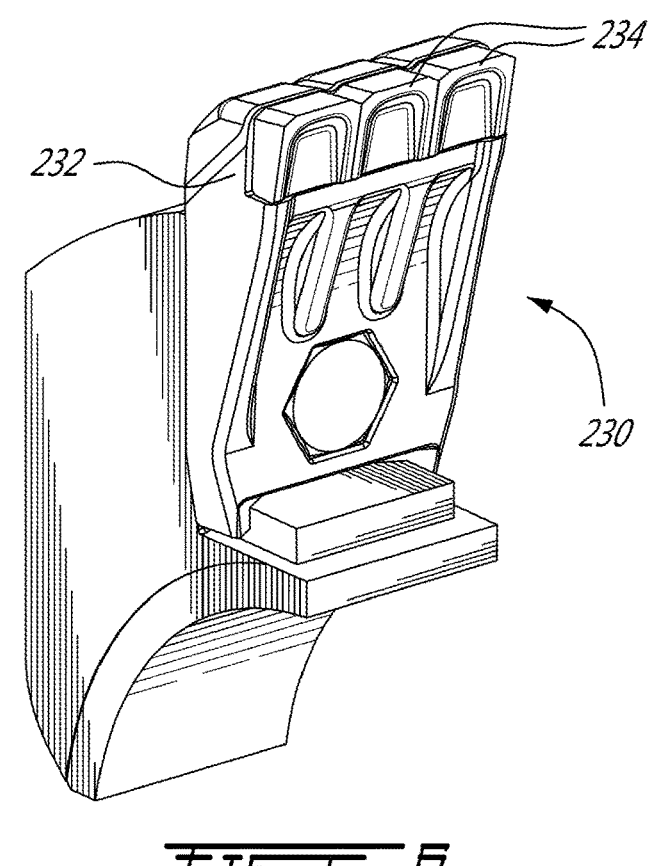
_FIG_ 6
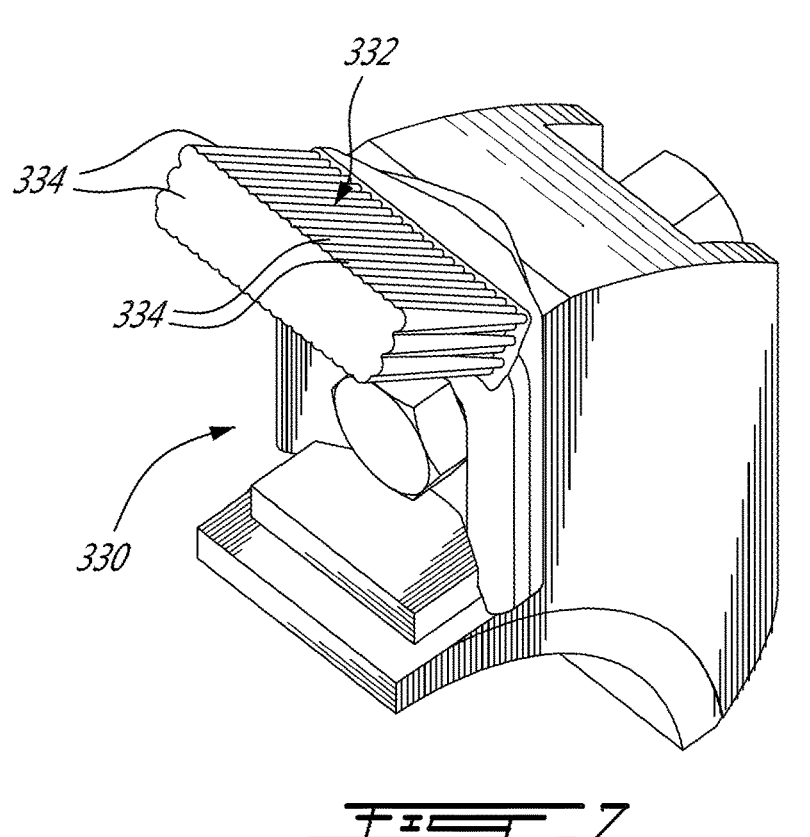
_FIG_ 7

MATERIAL PROCESSING HEAD AND TOOL AND RELATED METHODS

CROSS REFERENCE TO RELATED APPLICATIONS

This application is a continuation of U.S. patent application Ser. No. 17/208,833 filed Mar. 22, 2021, which is a continuation of U.S. patent application Ser. No. 15/132,831 filed Apr. 19, 2016, now U.S. Pat. No. 10,953,406, the disclosure of each of which is incorporated herein by reference.

TECHNICAL FIELD

The application relates generally to devices used for material processing operations and, more particularly, to a displaceable material processing head.

BACKGROUND OF THE ART

Cutting heads used in brush cutters are known. The cutting teeth on brush cutters are often designed and mounted on the mounting blocks on the cutting head to cut in a tangential direction when the cylindrical cutting head is rotated. The cutting teeth are thus exposed to shear forces, which can cause the teeth to prematurely wear, or break off the cutting head. Teeth can be costly to replace when broken or damaged.

SUMMARY

In one aspect, there is provided a displaceable material processing head, comprising: a support base; a plurality of tool mounting blocks mounted on an outer surface of the support base, each mounting block having a base surface and a tool mounting surface intersecting the base surface, the base surface having a protuberance extending away therefrom and spaced apart from the tool mounting surface to define a tool receiving gap between the protuberance and the tool mounting surface; and a plurality of tools for material processing each retained in a respective one of the mounting blocks, each tool having a base section and a processing section extending from the base section, the base section being snugly received in the tool receiving gap of the respective one of the mounting blocks between the tool mounting surface and the protuberance and abutting the tool mounting surface, the processing section extending past the protuberance.

In another aspect, there is provided a method of mounting a material processing tool to a mounting block secured to a displaceable head, the method comprising: fitting snugly the tool on the mounting block between a mounting surface of the mounting block and protuberance of the mounting block spaced apart from the mounting surface; and securing the tool to the mounting block.

In yet another aspect, there is provided a material processing tool assembly, comprising: a tool for material processing having a base section and a processing section extending from the base section; and a tool mounting block mountable on an outer surface of a support base, the mounting block having a base surface and a tool mounting surface intersecting the base surface, the base surface having a protuberance extending away therefrom and spaced apart from the tool mounting surface to define a tool receiving gap between the protuberance and the tool mounting surface, the base section of the tool being snugly received in the tool receiving gap between the tool mounting surface and the protuberance in abutment with the tool mounting surface, the processing section of the tool extending past the protuberance.

DESCRIPTION OF THE DRAWINGS

Reference is now made to the accompanying figures in which:

FIG. 1A is a schematic tridimensional view of a material processing head having mounting blocks and material processing tools, according to an embodiment of the present disclosure;

FIG. 1B is a schematic side view of the head as shown in FIG. 1A;

FIG. 2A is a schematic side tridimensional view of one of the mounting blocks of the head of FIG. 1A;

FIG. 2B is a schematic front tridimensional view of the mounting block of FIG. 2A;

FIG. 2C is a schematic rear tridimensional view of the mounting block of FIG. 2A;

FIG. 3A is a schematic front tridimensional view of one of the tools of the head of FIG. 1A;

FIG. 3B is a schematic rear tridimensional view of the tool of FIG. 3A;

FIG. 3C is a schematic side view of the tool of FIG. 3A;

FIG. 4A is a schematic tridimensional view of the mounting block of FIGS. 2A-2C with the tool of FIGS. 3A-3C secured thereto;

FIG. 4B is a schematic side view of the mounting block and tool of FIG. 4A;

FIG. 6 is a schematic tridimensional view of a mounting block with a tool secured thereto, according to yet another embodiment of the present disclosure; and FIG. 7 is a schematic tridimensional view of a mounting block with a tool secured thereto, according to yet another embodiment of the present disclosure.

DETAILED DESCRIPTION

Figure 5A:
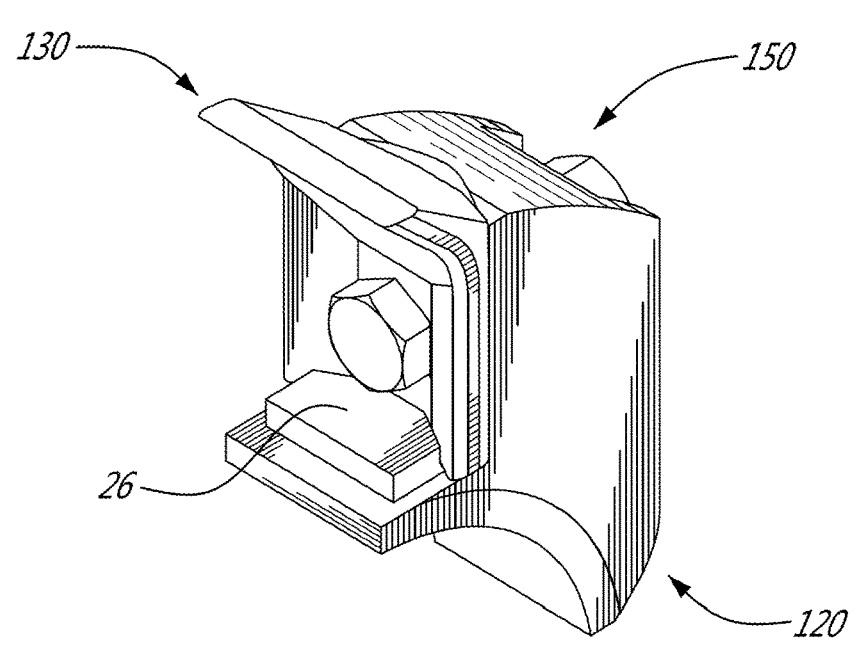
FIG. 5A is a schematic tridimensional view of a mounting block with a tool secured thereto, according to another embodiment of the present disclosure.

FIGS. 1A and 1B illustrate a displaceable material processing head 10. The material processing head 10 is powered by a suitable drive mechanism so that it can be put into motion. The motion of the head 10, and the material processing tools secured to the head 10 and discussed below, can effect an operation whereby material is processed. It can thus be appreciated that the head 10 can be any suitable tool head or device capable of such functionality. For example, and as shown in the illustrated embodiment, the head 10 is in the form of a rotatable brush cutting head for use with a brush cutter. The head 10, and the material processing operation carried out thereby, is not limited to cutting. The material processing operation can also include crushing, grinding, pulverising, shredding, scraping, pounding, removing, mulching, cutting, chipping, planing, or other similar manipulations of material using compaction, friction or shear. Similarly, the head 10 can undergo displacements and motion other than rotational displacements.

In the present specification, including claims, it is understood that the terms "front" and "rear" and related terms are used in relation to a normal direction of displacement of the material processing tools for ease of understanding, and are not intended to be limiting.

The head 10 has a support base 11. The support base 11 forms the corpus of the head 10 and provides structure thereto. The support base 11 is displaceable, such that it can be set in motion so that the head 10 can effect the above-described material processing operations. The support base 11 has an outer surface. In the embodiment shown, the support base 11 is a cylindrical drum, and thus has a cylindrical outer surface 12. Other configurations for the support base 11 are within the scope of the present disclosure, and are largely dependent on the material processing operation carried out by the head 10. A plurality of tool mounting blocks 20 are removably or fixedly fastened to the outer surface 12 of the support base 11. The mounting blocks 20 extend outwardly from the outer surface 12, and in this embodiment, extend outwardly in a radial or substantially radial direction. Each mounting block 20 carries a material processing tool 30 which extends outwardly from the support base 11 for performing the material processing operations.

In the embodiment shown in FIG. 1A, the mounting blocks 20 are mounted in two diametrically opposite rows. The mounting blocks 20 in each row can be equally spaced apart, and the mounting blocks 20 in one row can alternate with the mounting blocks 20 in another row in a direction parallel to a longitudinal axis 13 of the support base 11. Each mounting block 20 has a bottom or inner surface 21 shaped to match the shape of a portion of the outer surface 12. In the embodiment shown, the inner surface 21 is concavely curved and shaped like an arc of circle to match the circumferential outer surface 12 of the support base 11. Each mounting block 20 is secured, by welding or other suitable techniques, with its inner surface 21 flush against the outer surface 12 of the support base 11.

Referring to FIGS. 2A to 2C, the mounting block 20 has a tool mounting surface 22 and a base surface 23 against which a portion of a corresponding tool is mounted. The tool mounting surface 22 extends transversely to the outer surface of the support base. The tool mounting surface 22 intersects, and extends from, the base surface 23. The base surface 23 is shaped and positioned to receive a lower portion of the tool thereon. The base surface 23 forms, with the tool mounting surface 22, an interior corner 24 against which the tool is secured. The tool mounting surface 22 is oriented radially with respect to the support base 11. In the embodiment shown, the tool mounting surface is parallel to, and offset rearwardly from, a radial line RL (see FIG. 1) of the support base and of the inner surface 21 of the mounting block 20 intersecting the tip of the tool 30; it is understood that "oriented radially" is also intended to include the tool mounting surface 22 extending along the radial line RL, or at a slight angle with respect thereto (for example ±5°). The base surface 23 extends transversely from the tool mounting surface 22 and tangentially (i.e. perpendicular to the radial line RL, or at a slight angle from that perpendicular) to the outer surface of the support base and of the inner surface 21 of the mounting block 20. In the embodiment shown, the base surface 23 and the tool mounting surface 22 form a right angle at the interior corner 24; other configurations are also possible. A block mounting aperture 25 is defined in the tool mounting surface 22, and it extends through the mounting block 20 from the tool mounting surface 22, for aligning with a base section of the tool, as will be described.

Referring back to FIGS. 2A to 2C, in the embodiment shown, the tool mounting surface 22 has a profile or shape that is complementary to that of a surface of the tool that is configured to be placed against the tool mounting surface 22, as explained in greater detail below. In the embodiment shown, the tool mounting surface 22 is concave. The tool mounting surface 22 shown has a concave, V-shaped profile or cross-section. It is understood that alternately, the tool mounting surface 22 may have any other appropriate shape, including but not limited to, suitable curved, angled, concave, convex, and planar shapes.

Each mounting block 20 also has a protuberance 26 extending from the base surface 23. The protuberance 26 is a bump or protrusion which is positioned on the base surface 23 and spaced from the tool mounting surface 22. The protuberance 26 may be integrally formed with the base surface 23 during the manufacture of the mounting block 20. Alternatively, the protuberance 26 can be separate from the mounting block 20 and attached to the base surface 23. The protuberance 26 can be removed and replaced in such a configuration, which may be desired when the protuberance 26 becomes worn from use. A tool receiving gap 27 is formed in the distance between the protuberance 26 and the tool mounting surface 22. The tool receiving gap 27 is positioned, shaped, and sized to receive therein a base section of the tool, as will be discussed in greater detail below. More particularly, the protuberance 26 has a rear surface 26A which faces toward the tool mounting surface 22 and which is spaced apart therefrom across the tool receiving gap 27. A front surface 26F of the protuberance 26 is spaced apart forwardly from the rear surface 26A. The shape of the rear surface 26A can be complementary with the shape of the tool mounting surface 22. Referring to FIGS. 2A to 2C, the rear surface 26A extends between opposed lateral sides 26L of the protuberance 26. The rear surface 26A has a recessed portion 26AR positioned between the lateral sides 26L. The rear surface 26A is convex in FIGS. 2A to 2C, and the recessed portion 26AR is spaced further rearward from the front surface 26F of the protuberance 26 than the lateral sides 26L.

Referring now to FIGS. 3A to 3C, each material processing tool 30 is carried by a distinct mounting block 20. The material processing tool 30 has a base section 31 and a processing section 32 extending away from the base section 31. The base section 31 is removably secured to the corresponding mounting block 20, and the processing section 32 effects the material processing operation. The processing section 32 is angled forwardly with respect to the longitudinal direction L of the base section 31.

A rear surface 31A of the base section 31 is abuttable against the tool mounting surface 22 (see FIGS. 4A and 4B). An opposed front surface 31B of the base section 31 faces toward the protuberance 26 (see FIGS. 4A and 4B) and is abuttable thereagainst. In the embodiment shown, the tool 30 is a cutting blade or tooth. In this embodiment, the base section 31 is defined by a member of uniform or substantially uniform thickness straight along its longitudinal direction L and having a curved or angled cross-section (e.g. V-shaped) in a plane perpendicular to the longitudinal direction L. The processing section 32 is defined as a cutting section, and a front portion of the cutting section 32 is tapered to provide a cutting edge 32A. The cutting section 32 is angled forwardly with respect to the longitudinal direction L of the base section 31. As can be seen in FIG. 1, the cutting section 32 includes a front surface 35A which extends at the cutting edge 32A at a first angle $\theta1$ with respect to the radial line RL intersecting the cutting edge 32A. In a particular embodiment, the first angle $\theta1$ has a value of about 45°, for example 45°±5°. Other values are of course possible. In the embodiment shown, a cutting circumference C is defined by the travel of the cutting edge 32A as the cutting head rotates; a rear surface 35B of the cutting section 32 extends at the cutting edge 32A at a second angle θ2 with respect to a tangent to the cutting circumference C at the cutting edge 32A (i.e. at the intersection of the cutting circumference C with the radial line RL). In a particular embodiment, the cutting edge 32A is the radially outermost point of the tool 30, and the second angle θ2 has a value of about 8° inwardly of the tangent, for example 8°±5°. Other values are of course possible.

Referring back to FIGS. 3A to 3C, a tool mounting aperture 33 extends through the base section 31 of the tool 30 between its rear and front surfaces 31A,31B. The tool mounting aperture 33 is located to be aligned with the block mounting aperture 25 (see FIGS. 2A-2C) in the mounting block 20 when the tool 30 is mounted on the mounting block 20.

In the embodiment shown, the rear surface 31A of the tool 30 has a profile or shape complementary to the shape of the tool mounting surface 22 against which the rear surface 31A is abuttable. In the embodiment shown, the rear surface 31A is laterally convex, and thus suitable for mating engagement with the laterally concave tool mounting surface 22 described above. The rear surface 31A shown has a concave, V-shaped profile complementary to V-shaped profile of the tool mounting surface 22 described above. It will be appreciated that the tool mounting surface 22 and the rear surface 31A can have complementary shapes that are opposite than those described herein. For example, the tool mounting surface 22 can be convex while the rear surface 31A has a complementary concave shape. It is also understood that the rear surface 31A may have any other appropriate shape, including but not limited to, suitable curved, angled, concave, convex, and planar shapes. The front surface 31B of the base section 31 may also have any suitable shape.

Referring now to FIGS. 4A and 4B, a material processing tool assembly 50 is shown. The assembly 50 includes the tool 30 shown mounted and secured to the mounting block 20. A method of mounting the tool 30 to the mounting block 20, which is itself secured to the displaceable head 10, is now described. A bottom portion of the base section 31 of the tool 30 is placed in the interior corner 24. More particularly, a bottom surface of the base section 31 is placed against the base surface 23, while the rear surface 31A of the base section 31 is abutted against the tool mounting surface 22.

The rear surface 31A and the tool mounting surface 22 form a mating engagement because of their complementary shapes. In the embodiment shown, the concave tool mounting surface 22 mates with the convex rear surface 31A. This complementarity helps to provide a better engagement between the mounting block 20 and the tool 30. Positioning the tool 30 in this configuration aligns the block and tool mounting apertures 25,33. When so aligned, a bolt 34 or other suitable mechanical fastener can be inserted through the block and tool mounting apertures 25,33 to secure the tool 30 to the mounting block 20. Alternately, more than one fastener may be provided. In a particular embodiment, each fastener is spaced apart from the protuberance 26, so that no direct connection other than contact is provided between the protuberance 26 and the tool 30.

Positioning the tool 30 in this configuration also positions the base section 31 in the tool receiving gap 27 between the tool mounting surface 22 and the protuberance 26. More particularly, the base section 31 is snugly received or fitted in the tool receiving gap 27 between the tool mounting surface 22 and the protuberance 26. The expression "snugly" refers to the close-fit of the base section 31 between the tool mounting surface 22 and the protuberance 26. Stated differently, the base section 31 may be in direct engagement with the protuberance 26, or slightly spaced apart therefrom. In a particular embodiment, the front surface 31B of the base section 31 abuts the rear surface 26A of the protuberance 26. In the embodiment shown, the rear surface 26A has a shape which is similar to that of the tool mounting surface 22, and complementary to that of the front surface 31B of the tool 30. The abutment of the "V"-shaped rear surface 31A with the complementary shaped tool mounting surface 22 contributes to preventing the tool 30 from sliding relative to the mounting block 20. The protuberance 26 is sized so that the processing section 32 extends beyond the protuberance in order to effect the material processing operation.

When the tool 30 is secured in this position, such that its base section 31 abuts against the protuberance 26, the protuberance 26 helps the tool 30 to resist shear forces generated when the processing section 32 impacts material during the material processing operations described above. For example, in the embodiment shown where the tool 30 is a cutting tooth with the mounting block 20 mounted to a rotatable drum support base in a brush cutter head, as the support base rotates in direction R, the cutting edge 32A of the cutting section 32 impacts brush to be cleared. The impact of the cutting section 32 with the brush generates a shear force and/or moment, which generates a force that attempts to push the bottom of the base section 31 of the cutting tooth 30 away from the tool mounting surface 22. Over repeated uses, this can cause the cutting tooth 30 to rattle against the tool mounting surface 22, which may cause premature wear of the cutting edge 32A, and/or may loosen the attachment of the cutting tooth 30 to the mounting block 20. Furthermore, over repeated uses, this movement of the base section of the cutting tooth 30 can cause the bolt 34 to stretch, thereby loosing the attachment of the cutting tooth 30 to the mounting block 20. When so loosened, a portion of the cutting tooth 30 above the bolt 34 may undergo deformation after prolonged and repeated exposure to the above-described shear force.

In a particular embodiment, the protuberance 26 helps to counteract the shear moment acting against the base section 31 when the base section 31 of the tool 30 is abutted thereagainst. In so doing, the protuberance 26 contributes to reducing premature wear of the tool 30, for example of the cutting edge 32A, and reinforces the attachment of the tool 30 to the mounting block 20.

Figure 5B:
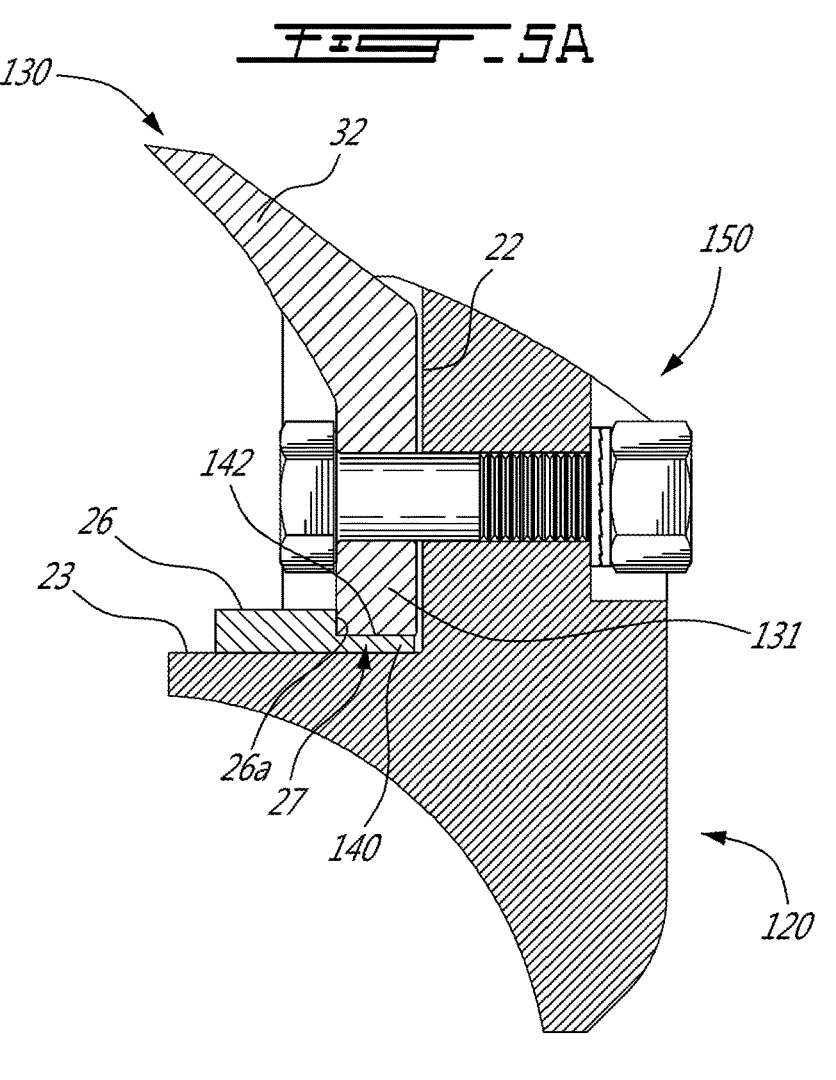
FIG. 5B is a cross-sectional side view of the mounting block and tool of FIG. 5A.

Referring now to FIGS. 5A and 5B, another embodiment of the material processing tool assembly 150 is shown. The assembly 150 includes a tool 130 and a mounting block 120 which are similar to the tool 30 and mounting block 20 previously described, with similar elements identified by the same reference numerals. The mounting block 120 however differs from the mounting block 20 in that it further includes a tongue 140 extending from the protuberance 26 into the tool receiving gap 27. The tongue 140 extends against the base surface 23 of the mounting block 120 a distance less than that of the protuberance 26, and is positioned between the protuberance 26 and the tool mounting surface 22; the surface 26a of the protuberance 26 thus extends from the tongue 140 to abut the tool 130. An exposed surface 142 of the tongue 140 receives a bottom surface of the base section 131 of the tool 30 thereon. In the embodiment shown, the base section 131 is larger than the tongue 140, and the bottom portion of the base section 131 includes a recess complementary to the tongue 140 so that the base section 131 mates with the tongue 140 and rests against the base surface 23 on each side of the tongue 140. Other configurations are possible.

In a particular embodiment, the tongue 140, in being positioned between the tool 130 and the base surface 23, helps to absorb impacts against the tool 130 which are directed towards the base surface 23, thereby helping to protect the mounting block 120 from a source of wear. When the tongue 140 becomes worn from use, it can be replaced as needed. In the embodiment shown, the tongue 140 is integral with the protuberance 26 and forms a monolithic component therewith. It will be appreciated that the tongue 140 can also be a separate component from the protuberance 26.

Although described above as a cutting tooth, the material processing tool 30 can also be any tool that effects a material processing operation. For example, and as shown in FIG. 6, where the material processing operation involves compaction (e.g. pounding, crushing, grinding, pulverizing, mulching, etc.), the tool can be a hammer 230. In the depicted embodiment, the processing section 232 of the hammer 230 includes compaction units 234 for effecting a compaction operation. In another example, and as shown in FIG. 7, where the material processing operation is abrasive in nature (e.g. scraping, abrading, polishing, etc.), the tool can be an abrasive brush 330. In the depicted embodiment, the processing section 332 of the brush 330 includes bristles 334 for effecting an abrasive operation. Similarly, where the material processing operation involves material removal (e.g. cutting, planing, chipping, etc.), the tool can be any appropriate type of blade.

Similarly, although shown and described herein as a brush cutter head, the material processing head 10 can include other moveable tool heads. For example, the head 10 can take the form of a linearly-displaceable plate or disc which is used to grind another material.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

What is claimed is:

1. A method of mounting a material processing tool to a mounting block secured to a displaceable head, the tool extending longitudinally outward in a longitudinal direction from the displaceable head, the method comprising:

fitting snugly the tool on the mounting block between a mounting surface of the mounting block and a protuberance of the mounting block spaced apart from the mounting surface by abutting a laterally convex rear surface of the tool against the mounting surface having a laterally concave shape and abutting a front surface of the tool against the protuberance, the laterally convex rear surface of the tool being lateral with respect to the longitudinal direction, wherein the mounting surface is parallel to and offset rearwardly from a radial line of the displaceable head intersecting a tip of the tool; and securing the tool to the mounting block.

2. The method of claim 1, wherein fitting the tool includes abutting the convex rear surface of the tool against the mounting surface having a V-shape complementary to a V-shape of the convex rear surface.

3. The method of claim 1, wherein fitting the tool includes mating a bottom surface of the tool with a tongue extending between the mounting surface and the protuberance, the bottom surface and tongue having complementary shapes.

4. The method of claim 1, wherein securing the tool to the mounting block includes interconnecting the tool and the mounting block through at least one fastener, each fastener being spaced apart from the protuberance.

5. The method of claim 1 wherein the mounting block has a base surface extending between the mounting surface and the protuberance, the base surface being shaped and positioned to receive a lower portion of the tool thereon, the method further comprising:

abutting the lower portion of the tool on the base surface.

6. The method of claim 5 wherein the mounting surface intersects and extends from the base surface.

7. The method of claim 5 wherein the base surface and the mounting surface form a right angle.

8. The method of claim 1 wherein the tool has a base section of substantially uniform thickness that is straight along the longitudinal direction and has a curved or angled cross-section in a plane perpendicular to the longitudinal direction.

9. A method of mounting a material processing tool to a mounting block secured to a displaceable head, the tool extending longitudinally outward in a longitudinal direction from the displaceable head, the method comprising:

fitting snugly the tool on the mounting block between a mounting surface of the mounting block and a protuberance of the mounting block spaced apart from the mounting surface by abutting a laterally convex rear surface of the tool against the mounting surface having a laterally concave shape and abutting a front surface of the tool against the protuberance, the laterally convex rear surface of the tool being lateral with respect to the longitudinal direction;

securing the tool to the mounting block; and removing and replacing the protuberance.

\* \* \* \* \*